E. & E. A. KLEEMAN.
DOUGH RAISER.
APPLICATION FILED MAR. 11, 1915.
1,192,071.    Patented July 25, 1916.
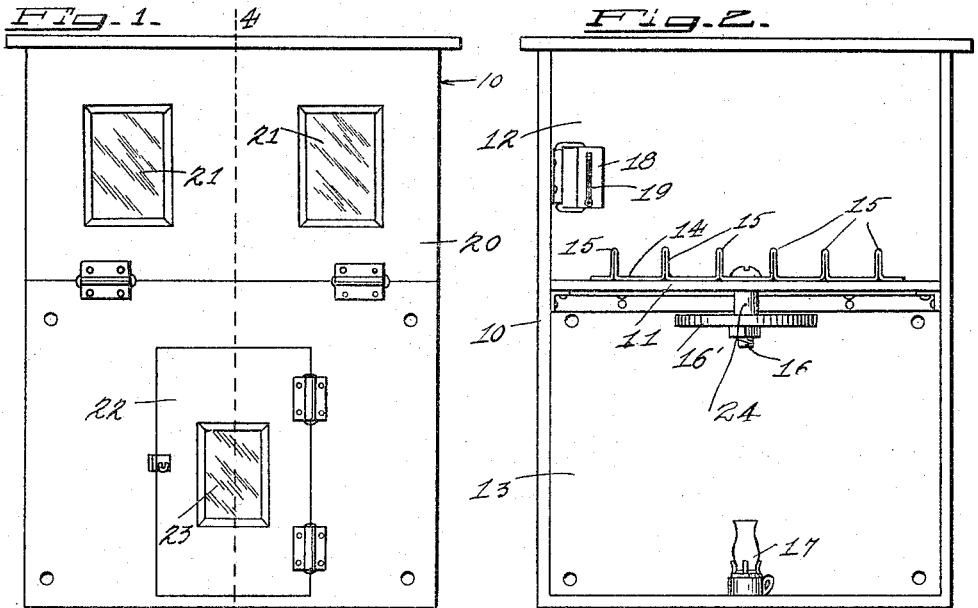
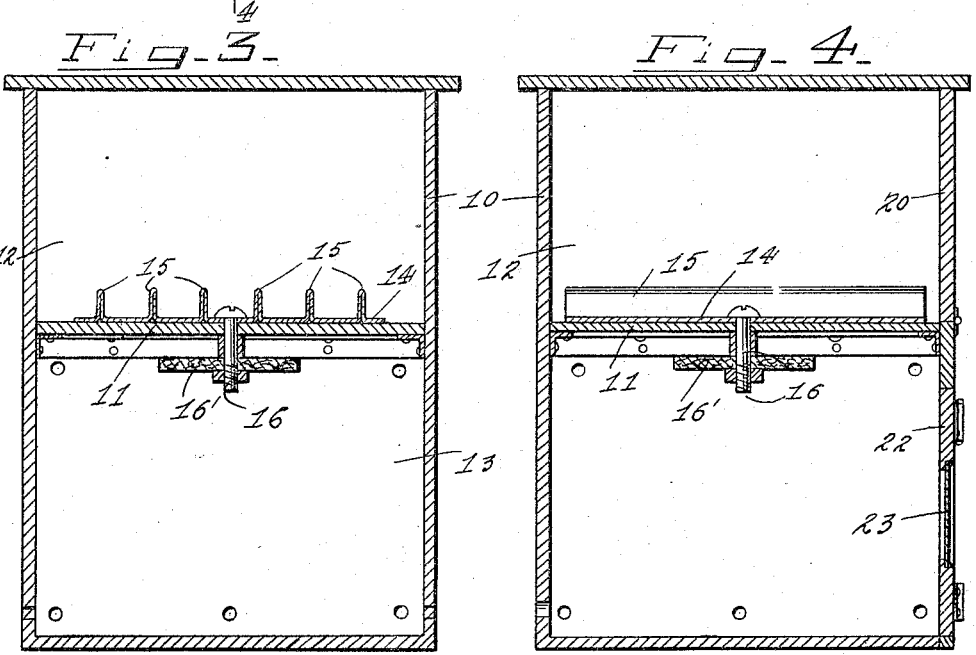
Witnesses
Inventor
E. Kleeman,
E. A. Kleeman.

UNITED STATES PATENT OFFICE.

EDWARD KLEEMAN AND EPPIE A. KLEEMAN, OF CANTON, SOUTH DAKOTA.

DOUGH-RAISER.

1,192,071.          Specification of Letters Patent.      Patented July 25, 1916.

Application filed March 11, 1915. Serial No. 13,652.

*To all whom it may concern:*

Be it known that we, EDWARD KLEEMAN and EPPIE A. KLEEMAN, citizens of the United States, residing at Canton, in the county of Lincoln, State of South Dakota, have invented certain new and useful Improvements in Dough-Raisers; and we do hereby declare the following to be a full, clear, and exact description of the invention, such as will enable others skilled in the art to which it appertains to make and use the same.

This invention relates to improvements in dough raising cabinets.

One object of the invention is to provide a device of this character of simple construction and by means of which the dough can be kept at an even temperature.

Another object is to provide a device of this character in which the heat from the lamp will be effectively and evenly distributed to the chamber in which the dough is placed.

Other objects and advantages will be apparent from the following description when taken in connection with the accompanying drawing.

In the drawing: Figure 1 is a front elevation of a dough raising cabinet made in accordance with our invention, Fig. 2 is a front elevation of the cabinet with the front thereof removed, Fig. 3 is a vertical section through the cabinet in a plane parallel to the front thereof, and Fig. 4 is a vertical section on the line 4—4 of Fig. 1.

Referring particularly to the accompanying drawing, 10 represents a suitable cabinet formed of any desired material, and having therein a horizontal floor 11 formed preferably of metal which divides the cabinet into an upper dough compartment 12 and the lower heating compartment 13. Disposed on the floor is a metal plate 14 which is formed with vertical parallel ribs 15 extending forwardly and rearwardly of the cabinet. A bolt 16 is passed through the plate 14 and the floor 11 and carries on its lower end below the floor an asbestos plate 16'. In the lower chamber 13 is a suitable lamp 17 which is disposed directly below the plate 16' so that the heat therefrom will directly attack the asbestos plate. Mounted on one wall of the chamber 12 is a swinging bracket 18 which carries a thermometer 19. A hinged door 20 provided with transparent windows 21 provides access to the compartment 12, this door extending the width of the cabinet. A smaller door 22 provides access to the lower or heating chamber, both of the doors being carried by the front wall of the cabinet. This lower door 22 is also provided with a transparent window 23.

Particular attention is called to the construction of the floor and ribbed plate together with its connection with the asbestos plate. The ribbed plate supports the pan of dough in such position that the hot air can readily circulate beneath the pan to thus more effectively hasten the raising of the dough. The asbestos plate is spaced a distance below the floor by means of a sleeve 24 so that the heat from the lamp can not directly attack the floor and cause the same to become overheated, thereby maintaining an even distribution of the heat and also of the proper temperature in the chamber 12.

What is claimed is:

A dough raiser including a cabinet having a lower heating chamber and an upper dough receiving chamber, said chambers being separated by a horizontal floor, a source of heat disposed in the lower chamber, a securing means disposed through the floor, a non-combustible disk carried by the lower end of the securing means and disposed over the source of heat, and a sleeve carried by the securing means between the floor and said disk for holding the disk out of contact with the floor.

In testimony whereof, we affix our signatures in the presence of two witnesses.

EDWARD KLEEMAN.
            EPPIE A. KLEEMAN.

Witnesses:
    F. H. BROOKS,
    ARTHUR THOMAS.

---

Copies of this patent may be obtained for five cents each, by addressing the "Commissioner of Patents, Washington, D. C."